United States Patent Office 3,452,200
Patented June 24, 1969

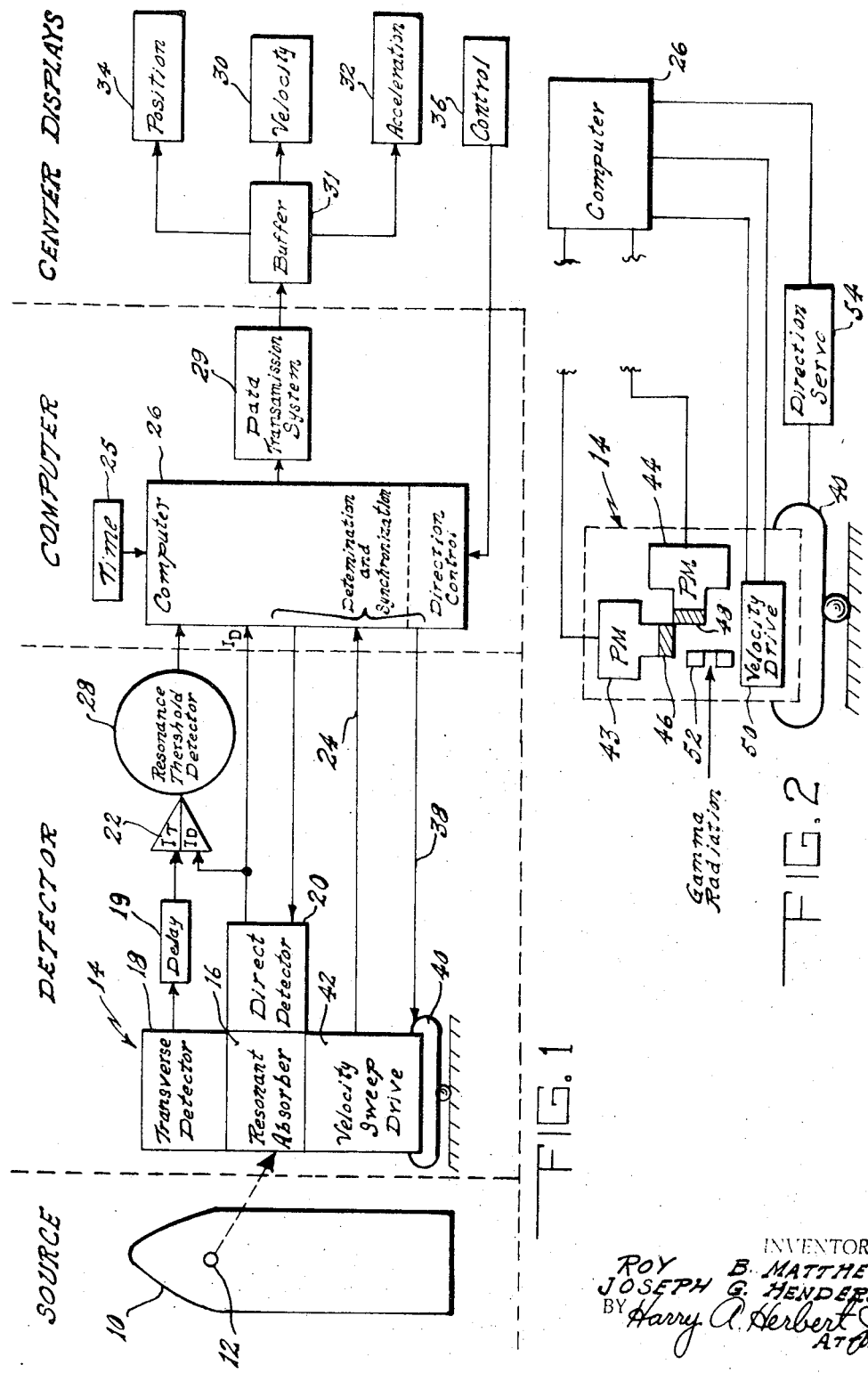

3,452,200
MISSILE VELOCITY AND LIFT-OFF TRAJECTORY MEASURING SYSTEM
Roy B. Matthews, Thousand Oaks, Calif., and Joseph G. Henderson, Baltimore, Md., assignors to the United States of America as represented by the Secretary of the Air Force
Filed July 13, 1966, Ser. No. 565,010
Int. Cl. G01b 15/00; H01j 39/12
U.S. Cl. 250—83.3        6 Claims

ABSTRACT OF THE DISCLOSURE

A missile velocity and lift-off trajectory measuring system having a source of monochromatic gamma radiation located on the missile and detecting means including a crystal absorber which moves at a sweeping velocity corresponding to the velocity range of the missile. The Mossbauer effect is utilized to detect resonance that occurs only when the missile and the absorber are moving at the same velocity thereby precisely indicating the zero relative velocity value from which the actual velocity and lift-off trajectory of the missile is computed and displayed.

This invention relates generally to a system for measuring the lift-off trajectory of a missile, and more specifically to a measuring system which utilizes a nuclear resonance technique known as the Mossbauer effect wherein monochromatic gamma emissions from cobalt-57 are resonantly absorbed by iron-57 material.

The extreme accuracy and the requirement for all-weather operation pose the most serious problems to any missile lift-off trajectory data system. Since these problems become less difficult to solve toward the higher end of the frequency spectrum, we have invented a tracking system using the Doppler shift in frequency of monochromatic gamma radiation.

At the frequency of gamma radiation, all-weather operation is assured. By utilizing coherent Mossbauer gamma, background radiation has no effect and the measurement system retains its usefulness in nuclear vehicle launch operations.

Basically, the Mossbauer effect is utilized to provide an indication of resonance and a measure of the deviation from resonance related to vehicular velocity. Theoretical accuracies in velocity measurement resolution of 0.01 cm./sec. are possible by using the Mossbauer effect. Acceleration data is obtained from computer operation on velocity data, and position information is obtained by triangulation of several source or detector combinations located around the launch pad.

A missile lift-off measurement system utilizing the nuclear resonance technique requires a source of monochromatic radiation to be attached to the missile, with a gamma ray detection system on the ground. The resonance measurement system is a velocity-sensitive device and the accuracy of the velocity measurement is independent of the intensity relationship, above a certain minimum. The system is then generally unaffected by variations in the attenuation coefficient of air.

A radioactive isotope, characterized by a small variation of photon energy is provided, for example, by cobalt-57, called a Mossbauer type isotope, in that a high percentage of the photons are available for ejection by recoilless emissions. Since nucleus recoil is the largest contributor to photon energy difference, its elimination results in an essentially constant energy radiation for a given transition.

The gamma photons can be detected with a crystal absorber such as $Fe^{57}$ which functions as an extremely narrow band filter. A Mossbauer source and absorber will be in resonance when their relative velocity is zero. Thus, if the source on the missile is in motion, resonance is destroyed by the Doppler effect. Since the missile is moving with respect to the absorber on the ground, resonance will not occur unless the relative velocity is changed to the resonance relative velocity.

The resonance relative velocity is zero for the Mossbauer materials, and is obtained by moving the absorber. Therefore, when the velocity of the absorber is controlled so that it can sweep all the velocities within which the missile velocity should be, the velocity can be precisely identified by the detection of resonance.

The system of this invention which uses a nuclear resonance technique as its basis for precisely measuring missile velocity, requires that a source of gamma photons of monochromatic energy be placed on the vehicle. When these photons cause resonance of the crystal absorber on the ground, the velocity of the gamma source and, consequently, the missile velocity may be precisely determined. Missile velocity can be measured by imparting a velocity to the absorber that results in zero relative velocity between source and absorber. The relative velocities are introduced on a recurring basis, that is the velocities from velocity minimum to velocity maximum must be swept for each desired reading, since only one resonance will occur during each sweep.

It is therefore an object of this invention to provide a new and improved system for measurement of a missile lift-off trajectory.

It is a further object of this invention to provide a missile lift-off trajectory measurement system which is capable of all-weather operation.

It is another object of this invention to provide a new and improved missile lift-off trajectory measurement system which incorporates the Mossbauer effect.

It is still a further object of this invention to provide a velocity measuring system which utilizes coherent gamma radiation and detectors therefor.

It is still another object of this invention to provide a system that will measure the acceleration of missiles without regard to weather, temperature or visibility.

It is still another object of this invention to provide a system that will measure the roll, pitch and yaw velocities of a missile at lift-off.

These and other advantages, features and objects of the invention will become more apparent from the following description taken in connection with the illustrative embodiments in the accompanying drawings wherein:

FIGURE 1 is a block diagram of the system embodied by this invention; and

FIGURE 2 is a schematic representation of the detector utilized by this invention.

Generally, nuclear resonance occurs when a photon is absorbed, thus raising the absorber to an excited state. If monochromatic photons are directed at an absorber composed of stable nuclei, the following effects can be observed at resonance. A scintillation detector placed directly behind the absorber will indicate a decrease of energy when the absorber is in resonance. However, a scintillation counter placed at right angles to the absorber will indicate an increase in energy. This is due to the absorber nuclei transcending from their resonating high energy state to their ground state by emitting photons. These emissions are random in direction. If the proper motion is imparted to either the source or the absorber, it is possible to find a relative velocity, for which the frequency decrease caused by recoil is compensated for, and thus resonance is produced.

According to the Mossbauer effect, recoil can be eliminated by anchoring the source nuclei in a rigid crystal structure. Hence, resonance is produced without introducing a velocity difference between source and absorber, but when a slight relative motion is introduced enough frequency shift is produced to destroy resonance. Thus, by utilizing this velocity information, it is possible to provide an accurate system for measurement of velocity, as is shown in FIGURE 1.

The missile 10 has located therein at least one source of monochromatic radiation 12. The detector shown generally at 14, consists of resonant absorber 16 with a transverse scintillation detector 18 and a direct scintillation detector 20. The detector 18 is located at right angles to the absorber crystal, while the detector 20 is placed behind the absorber crystal. The signal from the detector 18 passes through a delay 19 then to a comparator 22, while signal from the detector 16 passes directly to the comparator 22 and to the computer 26. When the relative velocity is such that resonance is not present, the majority of photons will pass through the crystal and be detected by the scintillation counter placed behind it.

At resonance, more photons will be absorbed in the crystal, raising the absorber nuclei from a ground to an excited state. When these nuclei transcend from their excited state to ground state, they emit photons in all directions, that is, each nuclei will emit a photon in some random direction. Hence, at resonance, the detector placed at right angles will note an increase in intensity and the ratio of the transverse to direct energy ($I_T/I_D$) will increase at resonance. At the same time that this increase in the ratio is detected at comparator 22, the velocity introduced into the absorber is measured as shown at 24, for this is the radial velocity of the missile with respect to the detector. The velocity and its time tag 25 are then sent to the computer 26, along with the output of the threshold detector 28. Time correlation of resonance detections allows the computation of position and acceleration data. This data is processed and sent through the data transmission system 29 to the buffer 31 and thence to the command center where it is displayed as actual velocity, roll velocity, pitch and yaw velocity (30). Roll, pitch, yaw and actual acceleration are displayed at 34.

Initially, the detector 14 must be pointed at the source of radiation located in the missile 10. The pointing data which is the result of predicted missile trajectory data or a computer extrapolated trajectory calculated from actual trajectory data is fed out of the computer 26 upon command 36. The data is fed via the information transmission system 38 to the orienting means 40, which may be of any conventional type which will serve the purpose. Once properly oriented the velocity sweep control 42 induces the relative velocity to the detectors. The velocity sweep may consist of such devices as a centrifuge, turntable, cam-operated devices, or combinations of turntable and cam and inclined plane devices.

Referring now to FIG. 2, the detector 14 consists of two photo multiplier tubes, 43 and 44, with sodium iodide scintillation crystals 46 and 48 located in the conventional manner. The velocity drive means 50 moves the resonant absorber 52 in a manner so that the incoming gamma will be treated as explained hereinbefore.

The absorber may be attached to the cone of a loudspeaker which is driven by a current wave shape which can take any form desired, such as sinusoidal, ramp or modified ramp providing lower slopes through the velocities of interest.

The initial positioning is made by the positioning means 40, which is actuated by the direction servo 54 on command of the computer 26.

While the system described has, for simplicity sake, been limited to one source with a single detector, it is also frequently desirable to utilize a system with a plurality of sources and detectors. In such a system each detector will measure a single velocity component of a single source point. Thus, each detector covers one degree of freedom and the ensemble of six detectors covers the six degrees of freedom of the missile, thus avoiding coupling between velocity components in any one measuring device. Each detector would be mounted on a supporting plate and following one velocity component of a single point on the missile. However, each supporting table should provide two types of motion to the detector crystal it is supporting. One motion is in the direction of the radial vector, connecting the detector to a source point on the missile, in order to seek the proper radial velocity which can keep the crystal frequency resonance by compensating for the instantaneous velocity component of the source point in the same direction, making the relative velocity of detector with respect to the associated source point equal to zero. The other motion required for the supporting plate is an incremental rotation of the plate between each two successive computation cycles to allow the detector to seek the radial direction of the missile source point and to continuously point at the associated source point. The radial velocity of the detector, at the instant when crystal resonance is reached, is picked off by the computer once per computation cycle, and the rotational increment, necessary for constant pointing at the missile source point, is computed and designed for rotational control of the detector support plate.

What is claimed is:

1. A system for measuring the lift-off trajectory of a missile system comprising: a source of monochromatic gamma radiation located on the missile; means remotely positioned from said missile for detecting the monochromatic radiation; said detecting means moving at a sweeping velocity corresponding to the velocity range of the missile; means associated with said detecting means for tracking the source of radiation; computer means for analyzing the information derived from said tracking means; and display means to provide a visual indication of the lift-off trajectory of the missile.

2. A system according to claim 1 wherein: the source of radiation is cobalt-57.

3. A system according to claim 1 wherein: the means for detecting the radiation comprises a crystal absorber, which is in resonance with the radiation source; and radiation detectors located around the crystal to detect a change from resonance.

4. A system for measuring the lift-off trajectory of a missile according to claim 3 wherein: the crystal absorber is iron-57.

5. A system according to claim 1 wherein: the means for tracking the source of radiation includes a detector pointing means to locate the source on the missile; and a velocity sweep means to cause the detector to follow the missile upon lift-off.

6. A system for measuring the lift-off trajectory of a missile according to claim 1 wherein: the radiation source and detector are in resonance.

References Cited

UNITED STATES PATENTS

| | | | |
|---|---|---|---|
| 3,146,624 | 9/1964 | Talbot | 250—84 X |
| 3,193,683 | 7/1965 | Reiffel | 250—106.5 |
| 3,291,987 | 12/1966 | Chope | 250—83.3 |

ARCHIE R. BORCHELT, *Primary Examiner.*

U.S. Cl. X.R.

73—517; 250—84; 324—70